US011190670B2

(12) United States Patent
Wang et al.

(10) Patent No.: US 11,190,670 B2
(45) Date of Patent: Nov. 30, 2021

(54) METHOD AND A SYSTEM FOR PROCESSING IMAGES BASED A TRACKED SUBJECT (71) Applicant: LENOVO (BEIJING) LIMITED, Beijing (CN)

(72) Inventors: Dong Wang, Beijing (CN); Wei Liu, Beijing (CN)

(73) Assignee: LENOVO (BEIJING) LIMITED, Beijing (CN)

(*) Notice: Subject to any disclaimer, the term of this patent is extended or adjusted under 35 U.S.C. 154(b) by 5 days.

(21) Appl. No.: 16/627,704

(22) PCT Filed: Oct. 19, 2017

(86) PCT No.: PCT/CN2017/106866
§ 371 (c)(1),
(2) Date: Dec. 30, 2019

(87) PCT Pub. No.: WO2019/000715
PCT Pub. Date: Jan. 3, 2019

(65) Prior Publication Data
US 2020/0128154 A1 Apr. 23, 2020

(30) Foreign Application Priority Data
Jun. 30, 2017 (CN) .......................... 201710530682.0

(51) Int. Cl.
*H04N 5/222* (2006.01)
*G06T 7/536* (2017.01)
(Continued)

(52) U.S. Cl.
CPC ............ *H04N 5/2226* (2013.01); *G06T 3/40* (2013.01); *G06T 7/536* (2017.01); *H04N 5/23218* (2018.08)

(58) Field of Classification Search
CPC .. H04N 5/2226; H04N 5/23218; H04N 5/272; G06T 7/536; G06T 3/40;
(Continued)

(56) References Cited

U.S. PATENT DOCUMENTS 7,639,935 B2 * 12/2009 Bartilson ........... H04N 5/23296
396/78
9,538,081 B1 * 1/2017 Zhou .................. H04N 5/23248
(Continued)

FOREIGN PATENT DOCUMENTS

CN          1837939 A      9/2006
CN        101860732 A     10/2010
(Continued)

OTHER PUBLICATIONS

The World Intellectual Property Organization (WIPO) International Search Report for PCT/CN2017/106866 dated Mar. 28, 2018 6 Pages (including translation).

*Primary Examiner* — Richard A Hansell, Jr.
(74) *Attorney, Agent, or Firm* — Anova Law Group, PLLC (57) ABSTRACT

A method for image processing includes the steps of: acquiring a first image including a foreground and a background, tracking a subject to be photographed in the foreground to determine a corresponding first foreground center offset and a corresponding first foreground pre-scaling ratio, performing a smooth processing on the first foreground pre-scaling ratio to obtain a first foreground quasi-scaling ratio, and outputting a second image based on the first foreground center offset and the first foreground quasi-scaling. A system and a non-transitory computer-readable storage medium for processing an image using the above method are also described.

6 Claims, 8 Drawing Sheets

(51) Int. Cl.
*H04N 5/232* (2006.01)
*G06T 3/40* (2006.01)

(58) Field of Classification Search
CPC . G06T 2207/10016; G06T 2207/20081; G06T 5/002; G06T 7/248; G06T 7/269
See application file for complete search history.

(56) References Cited

U.S. PATENT DOCUMENTS

| | | | |
|---|---|---|---|
| 9,838,609 B2 * | 12/2017 | Ogawa | H04N 5/23222 |
| 9,992,416 B2 | 6/2018 | Vacura | |
| 10,334,153 B2 | 6/2019 | Li | |
| 2011/0090341 A1 | 4/2011 | Ikewada et al. | |
| 2011/0096204 A1 | 4/2011 | Katsumata | |
| 2012/0201427 A1 | 8/2012 | Jasinski et al. | |
| 2014/0071325 A1 * | 3/2014 | Kawahara | G03B 17/40 |
| | | | 348/333.11 |
| 2016/0227128 A1 * | 8/2016 | Um | H04N 5/222 |
| 2017/0104938 A1 * | 4/2017 | Shimosato | H04N 5/23296 |
| 2017/0272661 A1 * | 9/2017 | Tsubusaki | H04N 5/23296 |

FOREIGN PATENT DOCUMENTS

| | | | | |
|---|---|---|---|---|
| CN | 102591366 A | | 7/2012 | |
| CN | 103533249 A | * | 1/2014 | |
| CN | 103533249 A | | 1/2014 | |
| CN | 103729639 A | | 4/2014 | |
| CN | 105100615 A | | 11/2015 | |
| CN | 106127744 A | | 11/2016 | |
| CN | 106488126 A | | 3/2017 | |
| CN | 106534590 A | | 3/2017 | |
| CN | 206136124 U | | 4/2017 | |
| CN | 107370941 A | | 11/2017 | |
| EP | 1705893 B1 | * | 3/2019 | G03B 29/00 |
| EP | 1705893 B1 | | 3/2019 | |

* cited by examiner

METHOD AND A SYSTEM FOR PROCESSING IMAGES BASED A TRACKED SUBJECT

CROSS-REFERENCES TO RELATED APPLICATIONS

This application is a national phase entry under 35 U.S.C § 371 of International Application No. PCT/CN2017/106866 filed on Oct. 19, 2017, which claims priority of Chinese Patent Application No. 201710530682.0, filed on Jun. 30, 2017, the entire contents of all of which are incorporated herein by reference.

FIELD OF THE DISCLOSURE

The present disclosure relates to a method and a system for processing an image.

BACKGROUND

Currently, when a smart camera is used to preview and record a video, for a foreground (e.g., a person) far away from the camera, the foreground becomes smaller as the distance from the camera increases. Human eyes are more sensitive to the foreground and thus are desirable to see a scene in the foreground more intuitively. When a current scene is far away from the camera, the foreground becomes smaller and more details such as human expressions, some subtle movements, and the like become unclear. At this point, it is desirable to maintain the original size of the foreground. In the process of implementing the present disclosure, inventors have found at least following defects exist in the related technology: if the foreground is directly cut out and enlarged to keep the background unchanged, the foreground may appear unnatural.

BRIEF SUMMARY

One aspect of the present application provides a method for processing images, including acquiring a first image including a foreground and a background; tracking a subject to be photographed in the foreground to determine a corresponding first foreground center offset and a corresponding first foreground pre-scaling ratio; performing a smooth processing on the first foreground pre-scaling ratio to obtain a first foreground quasi-scaling ratio; and outputting a second image based on the first foreground center offset and the first foreground quasi-scaling.

Optionally, performing the smooth processing on the first foreground pre-scaling ratio to obtain the first foreground quasi-scaling ratio includes determining whether a ratio value of the first foreground pre-scaling ratio is within a preset numerical range; and in response to the ratio value of the first foreground pre-scaling ratio being determined to be within the preset numerical range, performing the smooth processing on the first foreground pre-scaling ratio to obtain the first foreground quasi-scaling ratio.

Optionally, performing the smooth processing on the first foreground pre-scaling ratio to obtain the first foreground quasi-scaling ratio includes determining whether the ratio value is within a first sub-range of the preset numerical range; and in response to the ratio value being determined to be within the first sub-range of the preset numerical range, setting a specified value in the first sub-range as the ratio value of the first foreground quasi-scaling ratio.

Optionally, the method further includes in response to the ratio value of the first foreground pre-scaling ratio being within a second sub-range different from the first sub-range of the preset numerical range, setting the first foreground pre-scaling ratio as the first foreground quasi-scaling ratio.

After setting the first foreground pre-scaling ratio as the first foreground quasi-scaling ratio and outputting the second image, the method further includes tracking the subject to be photographed according to the second image, to determine a corresponding second foreground center offset and a corresponding second foreground pre-scaling ratio; determining whether a ratio value of the second foreground pre-scaling ratio is within the second sub-range; in response to the ratio value of the second foreground pre-scaling ratio being determined to be within the second sub-range, calculating a product of the first foreground pre-scaling ratio and the second foreground pre-scaling ratio; determining whether the product is within the first sub-range; in response to the product being determined to be within the first sub-range, setting the specified value as the ratio value of the second foreground quasi-scaling ratio; and outputting a third image according to the second foreground center offset and the second foreground quasi-scaling ratio.

Another aspect of the present application provides a system for processing an image, including an acquisition module, configured to acquire a first image including a foreground and a background; a first determination module, configured to track a subject to be photographed in the foreground to determine a corresponding first foreground center offset and a corresponding first foreground pre-scaling ratio; a processing module, configured to perform a smooth processing on the first foreground pre-scaling ratio to obtain a first foreground quasi-scaling ratio; and a first output module, configured to output a second image based on the first foreground center offset and the first foreground quasi-scaling.

Optionally, the processing module includes a decision unit, configured to decide whether a ratio value of the first foreground pre-scaling ratio is within a preset numerical range; and a processing unit, configured to, in response to the ratio value of the first foreground pre-scaling ratio being determined to be within the preset numerical range, perform the smooth processing on the first foreground pre-scaling ratio to obtain the first foreground quasi-scaling ratio.

Optionally, the processing unit includes a decision sub-unit, configured to decide whether the ratio value is within a first sub-range of the preset numerical range; and a determination sub-unit, configured to, in response to the ratio value being determined to be within the first sub-range of the preset numerical range, set a specified value in the first sub-range as the ratio value of the first foreground quasi-scaling ratio.

Optionally, the system further includes a second determination module, configured to, in response to the ratio value of the first foreground pre-scaling ratio being within a second sub-range different from the first sub-range of the preset numerical range, set the first foreground pre-scaling ratio as the first foreground quasi-scaling ratio.

Optionally, the system further includes a third determination module, configured to, after setting the first foreground pre-scaling ratio as the first foreground quasi-scaling ratio and outputting the second image, track the subject to be photographed according to the second image, thereby determining a corresponding second foreground center offset and a corresponding second foreground pre-scaling ratio; a first decision module, configured to decide whether a ratio value of the second foreground pre-scaling ratio is within the second sub-range; a computation module, configured to, in response to the ratio value of the second foreground pre-scaling ratio being determined to be within the second sub-range, compute a product of the first foreground pre-scaling ratio and the second foreground pre-scaling ratio; a second decision module, configured to decide whether the product is within the first sub-range; a fourth determination module, configured to, in response to the product being within the first sub-range, set the specified value as the ratio value of the second foreground quasi-scaling ratio; and a second output module, configured to output a third image according to the second foreground center offset and the second foreground quasi-scaling ratio.

Another aspect of the present application provides a non-volatile storage medium, storing instructions executable by a computer, where the instructions, when executed by the one or more processors, are configured to implement the method for processing images according to any one of the above-mentioned embodiments.

Another aspect of the present application provides a computer system, including one or more processors; and a memory which stores instructions executable by a computer, where the instructions, when executed by the one or more processors, are configured to implement the method for processing images according to any one of the above-mentioned embodiments.

BRIEF DESCRIPTION OF THE DRAWINGS

In order to more completely understand the present disclosure and the advantages, references may be made to the following description in conjunction with the accompanying drawings herein.

DETAILED DESCRIPTION

Hereinafter, some embodiments of the present disclosure are described with reference to the drawings. It should be understood, however, that the descriptions may be merely exemplary and may not intended to limit the scope of the present disclosure. In addition, in the following description, descriptions of well-known structures and techniques are omitted to avoid unnecessarily obscuring the concepts of the present disclosure.

The terminology used herein may be merely for the purpose of describing particular embodiments and may not intended to limit the present disclosure. The terms "including", "comprising" and the like as used herein may indicate the presence of stated features, steps, operations, and/or components, but may not exclude the presence or addition of one or more other features, steps, operations, or components.

All terms (including technical and scientific terms) used herein may have the same meaning as commonly understood by those skilled in the art unless otherwise defined. It should be noted that the terms used herein should be interpreted to have meanings consistent with the context of the specification and should not be interpreted in an idealized or overly rigid manner.

Some block diagrams and/or flowcharts are shown in the drawings. It should be understood that some blocks or combinations of block diagrams and/or flowcharts may be implemented by computer program instructions. The computer program instructions may be provided to processors of a general-purpose computer, a special purpose computer, or other programmable data processing devices, thus the instructions, when executed by the processors, may create means for implementing the functions/operations illustrated in the block diagrams and/or flowcharts.

Therefore, the techniques of the present disclosure may be implemented in the form of hardware and/or software (including firmware, microcode, and the like). In addition, the techniques of the present disclosure may take the form of a computer program product on a computer-readable medium which may store instructions, and the computer program product may be used by an instruction execution system or in conjunction with the instruction execution system. In the context of the present disclosure, the computer-readable medium may be any medium capable of containing, storing, transmitting, propagating, or transmitting instructions. For example, the computer-readable media may include, but may not be limited to, electrical, magnetic, optical, electro-magnetic, infrared, or semiconductor systems, devices, devices, or propagation media. Specific examples of computer-readable media may include magnetic storage devices such as magnetic tapes or hard disk drives (HDD), optical storage devices such as optical disks (CD-ROM), memories such as random-access memory (RAM) or flash memory, and/or wired/wireless communication links.

Some embodiments of the present disclosure provide a method and a system for processing an image. The method may include acquiring a first image including a foreground and a background, tracking a subject to be photographed in the foreground to determine a corresponding first foreground center offset and a corresponding first foreground pre-scaling ratio, performing a smooth processing on the first foreground pre-scaling ratio to obtain a first foreground quasi-scaling ratio, and outputting a second image based on the first foreground center offset and the first foreground quasi-scaling.

It should be noted that the application scenarios of some embodiments of the present disclosure may include one or more types, which may not be limited herein. For example, the method and system for processing the image may be configured to process videos and may also be configured to process images.

Figure 1A:
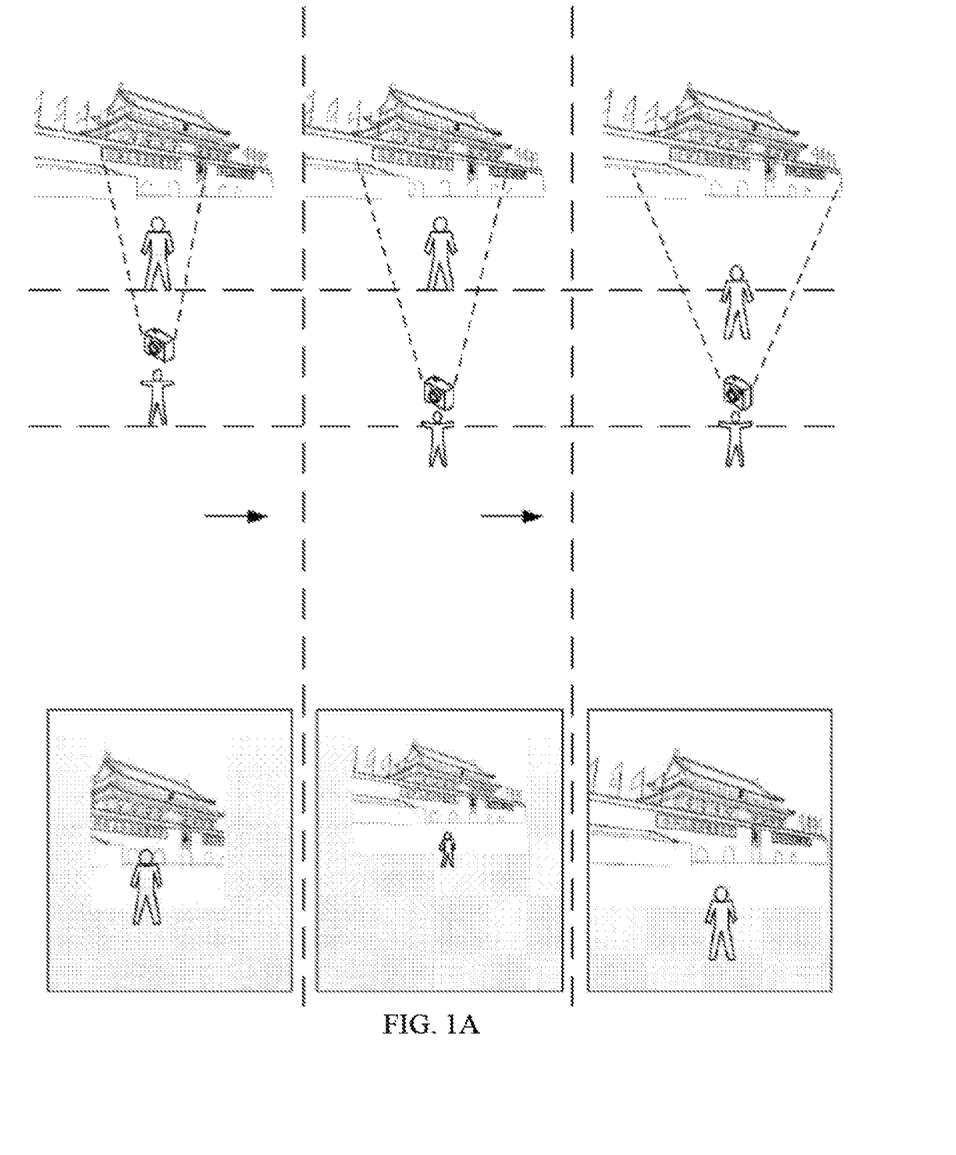
FIG. 1A illustrates a schematic of an existing photographing process.

FIG. 1A illustrates an example of a schematic of an existing photographing process. As shown in FIG. 1A, a situation (taking "the Tiananmen Square" as an example) is frequently encountered during the photographing process. The subject to be photographed is foreground and the Tiananmen is background according to the distance from the camera in the scenario. The subject to be photographed (the foreground) is already in position, but a photographer may find that the Tiananmen (the background) may not be taken in full during framing. Therefore, the photographer may have to move his own position, such as stepping back to fully photograph the Tiananmen. However, after stepping back, the photographer may also find the subject to be photographed (the foreground) seemed too small in the lens at this point, thus the subject to be photographed (the foreground) may be required to be "stand a little further". Such scenario is common in photographing, and the photographer prompts such as "stand a little further", "step back a little" and "three steps forward" and the like may be frequently heard in the process of photographing. As a matter of fact, the distance and proportion relationship between the foreground and the background is adjusted by the person movement to achieve the effect of showing a desirable proportion relationship in the lens between the foreground and the background. However, such manner may be troublesome, and both the photographer and the subject to be photographed are required to move their positions; in addition, in the process of repeatedly adjusting the positions, it may be easy to cause discomfort to the subject to be photographed.

In order to solve the above-mentioned problem, some embodiments of the present disclosure provide a method that the camera may automatically adjust the proportion relationship of the foreground and the background during the photographing process that the photographers may be required to move positions but the subject to be photographed may not be required to move positions, thereby enabling the foreground and the background to be presented in the image with an appropriate size.

Figure 1B:
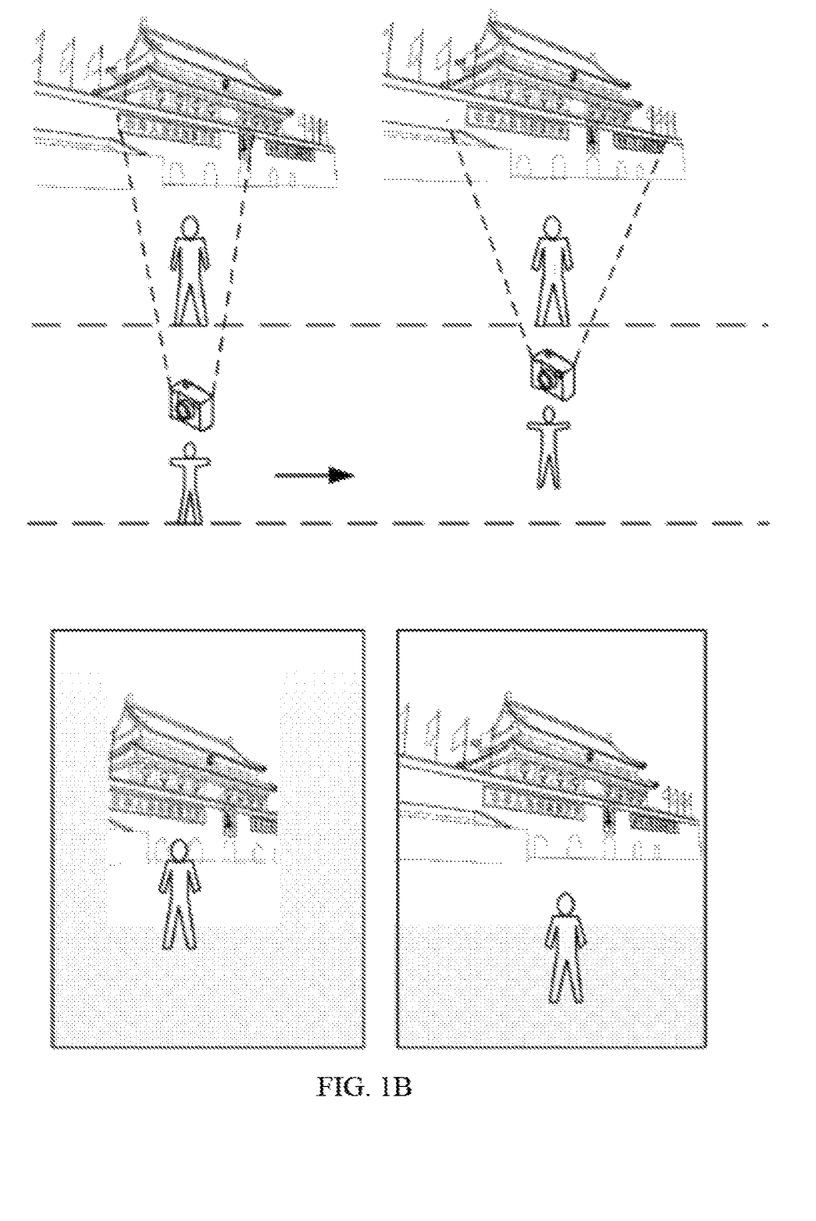
FIG. 1B illustrates an example of an application scenario of an applicable method and an applicable system for processing an image according to some embodiments of the present disclosure.

FIG. 1B illustrates an example of an application scenario of an applicable method and an applicable system for processing an image according to some embodiments of the present disclosure. As shown in FIG. 1B, in the application scenario, in response to the field of view being too narrow and the Tiananmen being not photographed in full, only the photographer may need to move forward and the subject to be photographed may not need to move backward, and the proportion of the Tiananmen in the lens may achieve a balancing effect.

According to some embodiments of the present disclosure, the image processing method is provided. The method may include acquiring the first image including the foreground and the background. The subject to be photographed in the foreground may be tracked to determine the corresponding first foreground center offset and the corresponding first foreground pre-scaling ratio. The first foreground pre-scaling ratio may be smoothed to obtain the first foreground quasi-scaling ratio. The second image may be outputted based on the first foreground center offset and the first foreground quasi-scaling.

Figure 2:
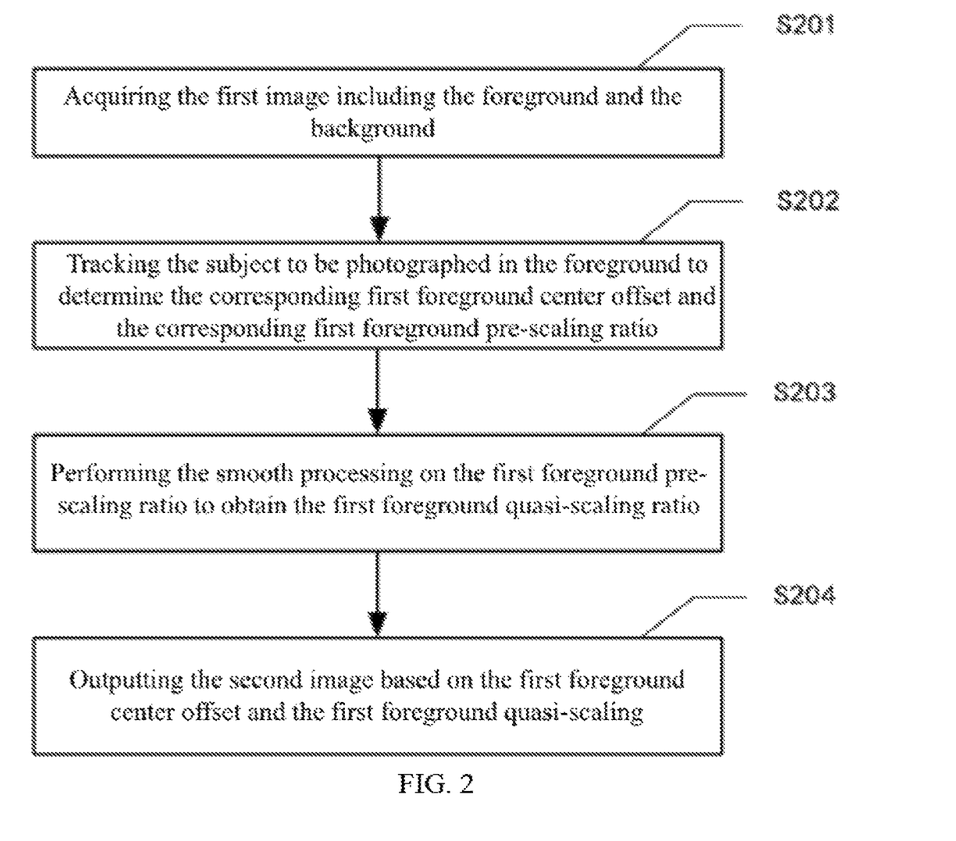
FIG. 2 illustrates an example of a flow chart of an image processing method according to some embodiments of the present disclosure.

FIG. 2 illustrates an example of a flow chart of an image processing method according to some embodiments of the present disclosure. As shown in FIG. 2, the method may include operations S201 to S204.

In S201, the first image including the foreground and the background may be acquired.

In S202, the subject to be photographed in the foreground may be tracked to determine the corresponding first foreground center offset and the corresponding first foreground pre-scaling ratio.

In S203, the smooth processing may be performed on the first foreground pre-scaling ratio to obtain the first foreground quasi-scaling ratio.

In S204, the second image may be outputted based on the first foreground center offset and the first foreground quasi-scaling.

It should be noted that the image processing method provided by some embodiments of the present disclosure may be applied to the scenario of photographing images and may also be applied to the scenario of capturing videos.

Taking a camera phone as an example, in some embodiments of the present disclosure, the first image may be a preview image or any one of a plurality of photographed images, which may not be limited herein. Preferably, the first image may be the preview image.

It should be noted that the camera phone may obtain the depth information of the subject to be photographed through the method of "dual cameras" or "multiple shots" to distinguish between the foreground and the background or by detecting person's photographs to distinguish a foreground person and a background object. When the camera phone is moved back and forth, the relative sizes of the foreground and the background may change. At this point, the position and size of the foreground in a photo preview interface may always be kept constant and the background may be normally enlarged or reduced as the camera phone moves back and forth, thereby obtaining the photograph with desirable framing as the first image. After obtaining the foreground, the photographer, during the movement, may track the foreground (i.e., the subject to be photographed in the foreground) and calculate the position change (i.e., the center offset) and the size change (i.e., the first foreground pre-scaling ratio) of the foreground object, and may maintain the foreground object to have a stable size and a proper position by real-time cropping (i.e., the first foreground pre-scaling ratio may be smoothed to obtain the first foreground quasi-scaling ratio, and the second image may be outputted based on the first foreground center offset and the first foreground quasi-scaling).

Specifically, when the photographer turns on the camera to start photographing, the image displayed in the preview screen may be a portion of the image obtained from a wide-angle lens, which is equivalent to the image photographed by a standard lens. At this point, if the photographer finds that the size of the background object (abbreviated as the background) is too large to photograph the full background, but the size of the foreground object (abbreviated as the foreground) is desirable, the photographer may approach the subject to be photographed (i.e., the foreground).

When the photographer moves forward, in a photographing mode provided by the related technology, the photographer may find that the size of the background object is almost unchanged, but the foreground is obviously larger. However, in the photographing mode provide by some embodiments of the present disclosure, when the photographer moves forward, the foreground may be enlarged, but the system may track the size change of the foreground through the above-mentioned operations and accordingly reduce the size of the entire image, thereby making the foreground be consistent with the size before the movement and making the obtained image of the background be wider than a corresponding image before the movement.

Similarly, in response to an opposition situation being encountered, that is, the size of the background object is too small and the size of the foreground object is desirable, the photographer may only need to move away from the subject to be photographed at this point. In the photographing mode provide by some embodiments of the present disclosure, the system may still complete cropping the image through the above-mentioned operations to obtain an image with the same foreground size but an enlarged background.

Taking video recording, using the mobile phone or other video recording device, as an example, a first frame of a video may be used as the first image, and the foreground person and the background object of the first image may be determined through face detection and depth images. In order to facilitate tracking, a rectangular frame or a frame of other shape may be configured in the center of the foreground, which may not be limited herein.

It should be noted that the foreground may be specified by a user when the foreground cannot be determined by the above-mentioned method. At this point, the rectangular frame may be provided at the center of the image through a user interface UI.

Specifically, starting from a second frame of the video, the foreground of the first frame in the rectangular frame may be tracked in a region 1.5 times the rectangular frame at the center position of the foreground; a foreground scaling parameter obtained (i.e., the first foreground pre-scaling ratio) by tracking the rectangular frame may be smoothed in a time domain, that is, the region within 1.5 times rectangular frame may be shifted and scaled till scaling to a final output size (e.g., may be set to 720p).

According to some embodiments of the present disclosure, the foreground and the background may be acquired; the subject to be photographed in the foreground may be tracked to determine the corresponding first foreground center offset and the corresponding first foreground pre-scaling ratio; the first foreground pre-scaling ratio may be smoothed to obtain the first foreground quasi-scaling ratio; and the second image may be outputted based on the first foreground center offset and the first foreground quasi-scaling. Therefore, the defect in the related technology that the foreground may be directly cut out and enlarged to keep the background unchanged, resulting in inconsistent and unnatural proportion of the foreground and the background in the image may be overcome, thereby achieving the technical effect of balancing the proportion of the foreground and the background in the image.

Additionally, during the implementation, the technical solution provided by some embodiments of the present disclosure may be adopted to, for the videos, perform the smooth processing on each frame image during the recording or after the recording, thereby achieving the movie vertigo effect.

The method shown in FIG. 2 may be further described with reference to FIG. 3A-FIG. 3B in combination with specific embodiments hereinafter.

According to some embodiments of the present disclosure, the smooth processing performed on the first foreground pre-scaling ratio to obtain the first foreground quasi-scaling ratio may include determining whether the ratio value of the first foreground pre-scaling ratio is within a preset numerical range. In response to the ratio value of the first foreground pre-scaling ratio being within the preset numerical range, the smooth processing may be performed on the first foreground pre-scaling ratio to obtain the first foreground quasi-scaling ratio.

Figure 3A:
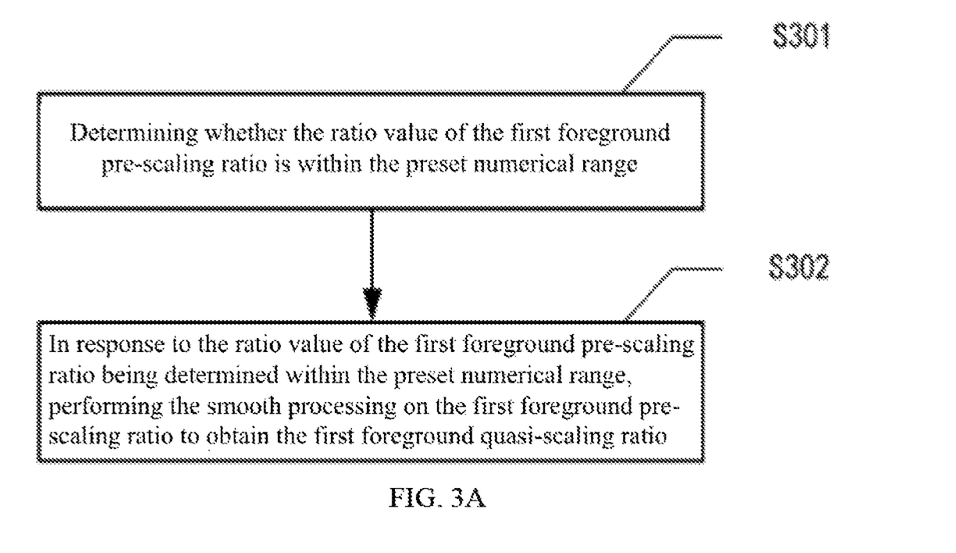
FIG. 3A illustrates an example of a flow chart of performing a smooth processing on a first foreground pre-scaling ratio to obtain a first foreground quasi-scaling ratio according to some embodiments of the present disclosure.

FIG. 3A illustrates an example of a flow chart of performing the smooth processing on the first foreground pre-scaling ratio to obtain the first foreground quasi-scaling ratio according to some embodiments of the present disclosure. As shown in FIG. 3A, the method may further include operations S301 and S302.

In S301, whether the ratio value of the first foreground pre-scaling ratio is within the preset numerical range is determined.

In S302, in response to the ratio value of the first foreground pre-scaling ratio being determined within the preset numerical range, the smooth processing may be performed on the first foreground pre-scaling ratio to obtain the first foreground quasi-scaling ratio.

Video recording using the mobile phone or other video recording device may be taken as an example.

For example, when the smooth processing is performed on the first foreground pre-scaling ratio in the time domain, 0.98-1.005 may be configured as an effective value processing interval; and when the ratio of the first foreground pre-scaling ratio falls between 0.98 and 1.005, the smooth processing may be performed on the first foreground pre-scaling ratio, that is the smooth processing may be performed on the second image; otherwise the smooth processing may not be performed on the first foreground pre-scaling ratio, that is, the second image is outputted according to the normal photographing mode.

According to some embodiments of the present disclosure, after the photographer moves, only images, that proportions of the foreground and the background are not consistent to certain degree, may be processed. On the one hand, the photographing efficiency may be improved, and on the other hand, the authenticity of the images photographed may be maintained.

According to some embodiments of the present disclosure, the smooth processing performed on the first foreground pre-scaling ratio to obtain the first foreground quasi-scaling ratio may include determining whether the ratio value is within a first sub-range of the preset numerical range. In response to the ratio value being determined within the first sub-range of the preset numerical range, a specified value in the first sub-range may be configured as the ratio value of the first foreground quasi-scaling ratio.

Figure 3B:
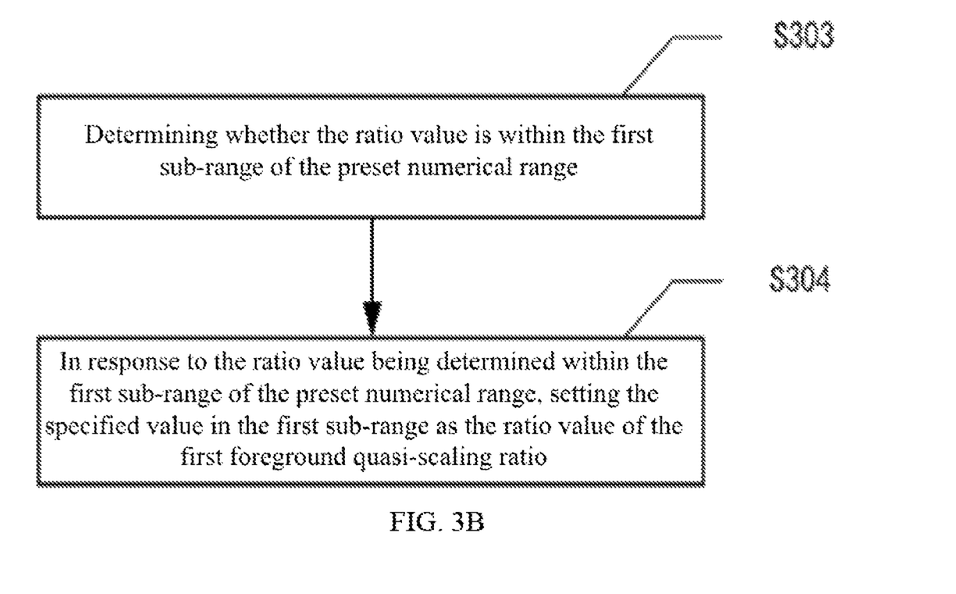
FIG. 3B illustrates an example of another flow chart of performing a smooth processing on a first foreground pre-scaling ratio to obtain a first foreground quasi-scaling ratio according to some embodiments of the present disclosure.

FIG. 3B illustrates an example of another flow chart of performing the smooth processing on the first foreground pre-scaling ratio to obtain the first foreground quasi-scaling ratio according to some embodiments of the present disclosure. As shown in FIG. 3B, the method may further include operations S303 and S304.

In S303, whether the ratio value is within the first sub-range of the preset numerical range is determined.

In S304, in response to the ratio value being determined within the first sub-range of the preset numerical range, the specified value in the first sub-range may be set as the ratio value of the first foreground quasi-scaling ratio.

According to some embodiments of the present disclosure, the image processing method may further include that in response to the ratio value of the first foreground pre-scaling ratio being determined within a second sub-range different from the first sub-range of the preset numerical range, the first foreground pre-scaling ratio may be configured as the first foreground quasi-scaling ratio.

For example, based on the examples in the above-mentioned embodiments, when the ratio value of the first foreground pre-scaling ratio is between 0.98 and 0.99, the foreground may be scaled and recorded according to 0.99, that is, 0.99 may be assigned to the first foreground quasi-scaling ratio; when the ratio value of the first foreground pre-scaling ratio is between 0.99 and 1, the foreground may be scaled according to a recorded number and 0.99, that is, 0.99 may be assigned to the first foreground quasi-scaling ratio. When the value is between 0.99 and 1, and the recorded number is 0, the processing may not be performed, but the ratio value of the first foreground pre-scaling ratio may be retained. In response to the ratio value of the first foreground pre-scaling ratio of a next frame being also between 0.99 and 1, the ratio value of the next frame may be multiplied with the ratio value of the previous frame, which is then accumulated, and so on. When the accumulated value is less than 0.99, the processing may be performed one time. The maximum number of accumulated frames is 5, that is, the processing may be performed at least one time for up to 5 frames. The final scaling ratio may be determined according to the average of the scaling ratios of the previous 5 frames.

When performing the smooth processing according to some embodiments of the present disclosure, on the one hand, the foreground quasi-scaling ratio may be determined simply and quickly, and on the other hand, the determination manner of the foreground quasi-scaling ratio may ensure that the proportion of the foreground and the background in the outputted image may be relatively consistent.

According to some embodiments of the present disclosure, after the first foreground pre-scaling ratio is set as the first foreground quasi-scaling ratio and the second image is outputted, the image processing method may further include that the subject to be photographed may be tracked, according to the second image, to determine a corresponding second foreground center offset and a corresponding second foreground pre-scaling ratio. Whether the ratio value of the second foreground pre-scaling ratio is within the second sub-range is determined. In response to the ratio value of the second foreground pre-scaling ratio being determined within the second sub-range, the product of the first foreground pre-scaling ratio and the second foreground pre-scaling ratio may be calculated. Whether the product is within the first sub-range is determined. In response to the product being within the first sub-range, a specified value may be set as the ratio value of the second foreground quasi-scaling ratio, and a third image may be outputted according to the second foreground center offset and the second foreground quasi-scaling ratio.

It should be noted that some embodiments of the present disclosure maybe applied to a scenario of continuous photographing or a scenario of video recording. The specific implementation manner may refer to the implementation manner shown in the examples in the above-mentioned embodiments, which may not be described in detail herein.

The smooth processing may be performed on multiple consecutive images according to some embodiments of the present disclosure. In such way, the foreground and background may be kept in ratio and be consistent in any two outputted consecutive images, thereby further making continuous images look more natural and smoother.

The technical solutions of the present disclosure are described in detail according to a specific embodiment thereinafter.

In S1: the user may turn on a video mode or play a mobile phone video.

In S2: a vertigo function may be started.

In S3: an intelligent foreground detection process may be started at a backend to automatically detect the foreground; when the environment is complicated or the user wants to configure the foreground, the UI may provide a rectangular box to the user.

S4 is for tracking; after the rectangular box is determined, the backend may call a tracking algorithm for the region 1.5 times the rectangular box at the center position, search the object to be tracked (the foreground), obtain the rectangular box and the center point, and calculate the center point offset.

In S5: the rectangular box obtained from the tracking may be compared with the previous tracking rectangular box to obtain the scaling ratio.

In S6: the smooth processing may be performed on the above-mentioned ratio in the time domain, and the 0.98-1.005 may be configured as an effective processing interval; when the scaling ratio in the fifth step is between 0.98 and 1.005, the corresponding smooth processing may be performed; otherwise the current image may not be processed, that is, the second image may be directly outputted; furthermore, when the scaling ratio is between 0.98 and 0.99, the foreground may be scaled and recorded according to 0.99; when the scaling ratio is between 0.99 and 1, based on the recorded number, the scaling processing may be performed according to 0.99; when the scaling ratio is between 0.99 and 1 and the recorded number is 0, the processing may not be performed, but the scaling value may be retained; in response to the scaling value of the next frame being also between 0.99 and 1, the scaling value of the next frame may be multiplied with the scaling value of the previous frame, which may be then accumulated, and so on; when the accumulated lave is less than 0.99, the processing may be performed one time; the maximum number of accumulated frames is 5, that is, the processing may be performed at least one time for up to 5 frames; and the scaling ratio may be determined according to the average of scaling ratios of the previous 5 frames.

In S7: the crop area offset obtained in the previous frame may be processed according to the scaling ratio using the center point offset in S4 and the scaling ratio in S6, and the crop area of the first frame may be an original resolution, and so on.

In S8: the above-mentioned crop area may be scaled to a uniform size for outputting.

At least the following technical effects may be implemented according to some embodiments of the present disclosure:

1) the video post-processing method may achieve the vertigo effect in movie shooting;

2) the foreground may be intelligently identified (e.g., face detection, depth images, objects from a far side to a near side or from a near side to a far side, and the like); and 3) the smooth processing of the scaling ratio may be performed in the time domain; for example, the smooth processing performed on a rectangular parameter in the time domain may enable the rectangular box obtained from the tracking to be steadily reduced, such that the entire video may look natural finally, and the situation that the background suddenly becomes larger or smaller may be eliminated.

Figure 4:
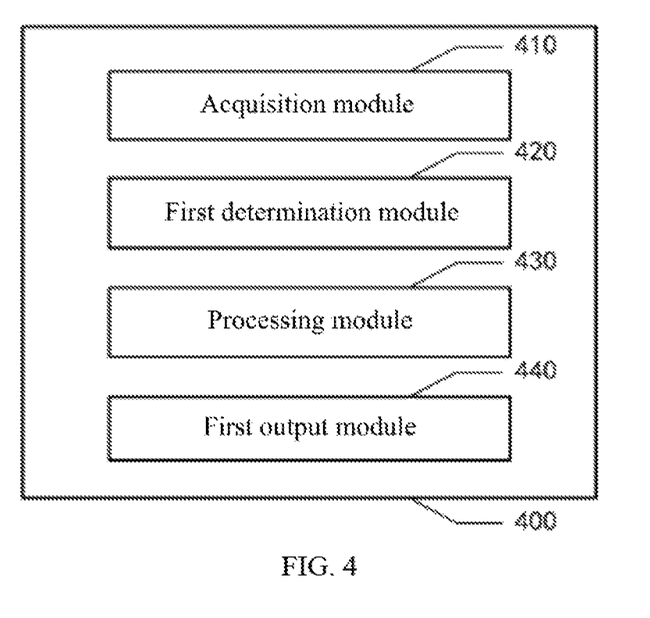
FIG. 4 illustrates an example of a block diagram of an image processing system according to some embodiments of the present disclosure.

FIG. 4 illustrates an example of a block diagram of the image processing system according to some embodiments of the present disclosure.

In some embodiments of the present disclosure, as shown in FIG. 4, the image processing system 400 may include an acquisition module 410, a first determination module 420, a processing module 430, and a first output module 440. The image processing system 400 may execute the method described above with reference to FIGS. 2-3B to implement the image processing function.

The acquisition module 410 may be configured to acquire the first image including the foreground and the background; the first determination module 420 may be configured to track the subject to be photographed in the foreground to determine the corresponding first foreground center offset and the corresponding first foreground pre-scaling ratio; the processing module 430 may be configured to perform the smooth processing on the first foreground pre-scaling ratio to obtain the first foreground quasi-scaling ratio; and the first output module 440 may be configured to output the second image based on the first foreground center offset and the first foreground quasi-scaling.

According to some embodiments of the present disclosure, the foreground and the background may be acquired, the subject to be photographed in the foreground may be tracked to determine the corresponding first foreground center offset and the corresponding first foreground pre-scaling ratio, the first foreground pre-scaling ratio may be smoothed to obtain the first foreground quasi-scaling ratio, and the second image may be outputted based on the first foreground center offset and the first foreground quasi-scaling. Therefore, the defect in the related technology that the foreground is directly cut out and enlarged to keep the background unchanged, resulting in inconsistent and unnatural proportion of the foreground and the background in the image may be overcome, thereby achieving the technical effect of balancing the proportion of the foreground and the background in the image.

Additionally, during the implementation, the technical solution provided by some embodiments of the present disclosure may be adopted to, for the videos, perform the smooth processing on each frame image during the recording or after the recording, thereby achieving the movie vertigo effect.

Figure 5A:
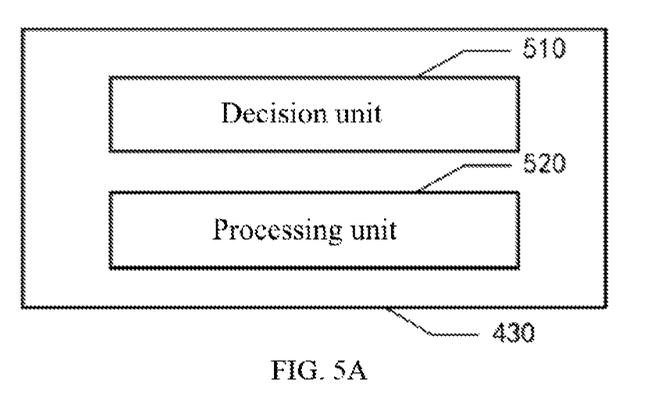
FIG. 5A illustrates an example of a block diagram of a processing module according to some embodiments of the present disclosure.

FIG. 5A illustrates an example of a block diagram of the processing module according to some embodiments of the present disclosure.

In some embodiments of the present disclosure, as shown in FIG. 5A, the processing module 430 may include a decision unit 510 and a processing unit 520.

The decision unit 510 may be configured to determine whether the ratio value of the first foreground pre-scaling ratio is within the preset numerical range; and the processing unit 520 may be configured to, in response to the ratio value of the first foreground pre-scaling ratio being determined within the preset numerical range, perform the smooth processing on the first foreground pre-scaling ratio to obtain the first foreground quasi-scaling ratio.

According to some embodiments of the present disclosure, after the photographer moves, only images, that proportions of the foreground and the background are not consistent to certain degree, may be processed. On the one hand, the photographing efficiency may be improved, and on the other hand, the authenticity of the images photographed may be maintained.

Figure 5B:
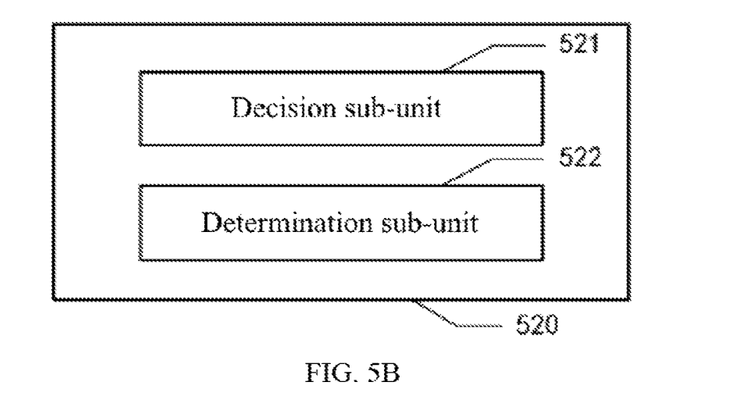
FIG. 5B illustrates an example of a block diagram of a processing unit according to some embodiments of the present disclosure.

FIG. 5B illustrates an example of a block diagram of the processing unit according to some embodiments of the present disclosure.

In some embodiments of the present disclosure, as shown in FIG. 5B, the processing unit may include a decision sub-unit 521 and a determination sub-unit 522.

The decision sub-unit 521 may be configured to determine whether the ratio value is within the first sub-range of the preset numerical range; and the determination sub-unit 522 may be configured to, in response to the ratio value being within the first sub-range of the preset numerical range, set the specified value in the first sub-range as the ratio value of the first foreground quasi-scaling ratio.

Figure 5C:
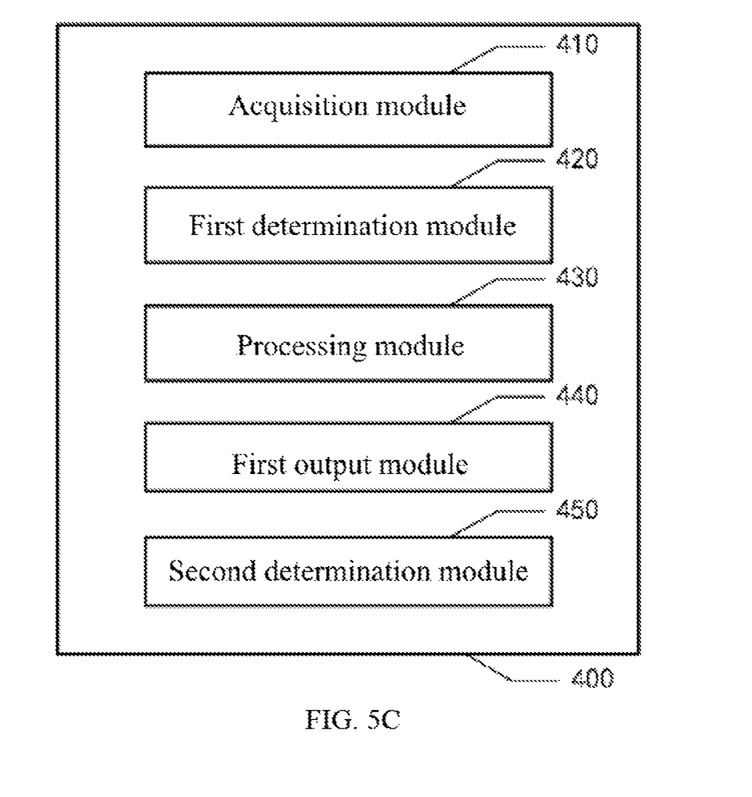
FIG. 5C illustrates an example of another block diagram of an image processing system according to some embodiments of the present disclosure.

FIG. 5C illustrates an example of another block diagram of the image processing system according to some embodiments of the present disclosure.

In some embodiments of the present disclosure, as shown in FIG. 5C, the image processing system 400 may further include a second determination module 450 in addition to the acquisition module 410, the first determination module 420, the processing module 430, and the first output module 440, where the acquisition module 410, the first determination module 420, the processing module 430, and the first output module 440 may be the same as the above-mentioned embodiments, which may not be described in detail herein.

The second determination module 450 may be configured to, in response to the ratio value of the first foreground pre-scaling ratio being within a second sub-range different from the first sub-range of the preset numerical range, set the first foreground pre-scaling ratio as the first foreground quasi-scaling ratio.

When performing the smooth processing according to some embodiments of the present disclosure, on the one hand, the foreground quasi-scaling ratio may be determined simply and quickly, and on the other hand, the determination manner of the foreground quasi-scaling ratio may ensure that the proportion of the foreground and the background in the outputted image may be relatively consistent.

Figure 5D:
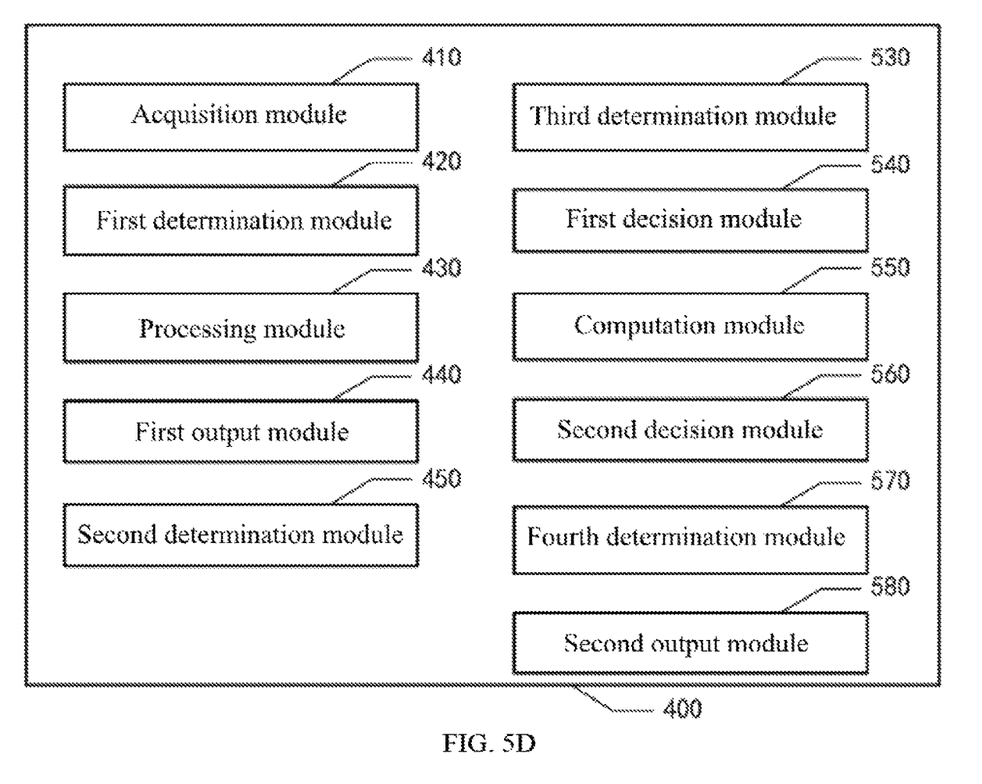
FIG. 5D illustrates an example of another block diagram of an image processing system according to some embodiments of the present disclosure.

FIG. 5D illustrates an example of another block diagram of the image processing system according to some embodiments of the present disclosure.

As shown in FIG. 5D, the image processing system 400 may further include a third determination module 530, a first decision module 540, a computation module 550, a second decision module 560, a fourth determination module 570, and a second output module 580 in addition to the acquisition module 410, the first determination module 420, the processing module 430, the first output module 440, and the second determination module 450, where the acquisition module 410, the first determination module 420, the processing module 430, the first output module 440, and the second determination module 450 may be the same as the above-mentioned embodiments, which may not be described in detail herein.

The third determination module 530 may be configured to, after the first foreground pre-scaling ratio is set as the first foreground quasi-scaling ratio and the second image is outputted, track the subject to be photographed according to the second image, thereby determining the corresponding second foreground center offset and the corresponding second foreground pre-scaling ratio. The first decision module 540 may be configured to decide whether the ratio value of the second foreground pre-scaling ratio is within the second sub-range. The computation module 550 may be configured to, in response to the ratio value of the second foreground pre-scaling ratio being within the second sub-range, compute the product of the first foreground pre-scaling ratio and the second foreground pre-scaling ratio. The fourth decision module 560 may be configured to decide whether the product is within the first sub-range. The fourth determination module 570 may be configured to, in response to the product being within the first sub-range, set the specified value as the ratio value of the second foreground quasi-scaling ratio. The second output module 580 may be configured to output the third image according to the second foreground center offset and the second foreground quasi-scaling ratio.

The smooth processing may be performed on multiple consecutive images according to some embodiments of the present disclosure. In such way, the foreground and the background may be kept in ratio and be consistent in any two outputted consecutive images, thereby further making continuous images look more natural and smoother.

It may be understood that the above-mentioned modules/units/sub-units may be combined and implemented in one module, or any one of the above-mentioned modules/units/sub-units can be split into multiple modules. Or, at least part of the functions of one or more of the above-mentioned modules/units/sub-units may be combined with at least part of the functions of other modules and also implemented in one module. According to some embodiments of the present disclosure, at least one of the above-mentioned modules/units/subunits may be implemented at least partially as a hardware circuit, such as a field programmable gate array (FPGA), a programmable logic array (PLA), a system on a chip, a substrate system on package, system on package, application specific integrated circuit (ASIC), or may be implemented as hardware or firmware in any other reasonable manner to integrate or package the circuit, or may be implemented by a proper combination of three implementation manners including software, hardware, and firmware. Or, at least one of the above-mentioned modules/units/subunits may be implemented at least partially as a computer program module, and when the program is executed by a computer, the functions of the corresponding modules may be performed.

Figure 6:
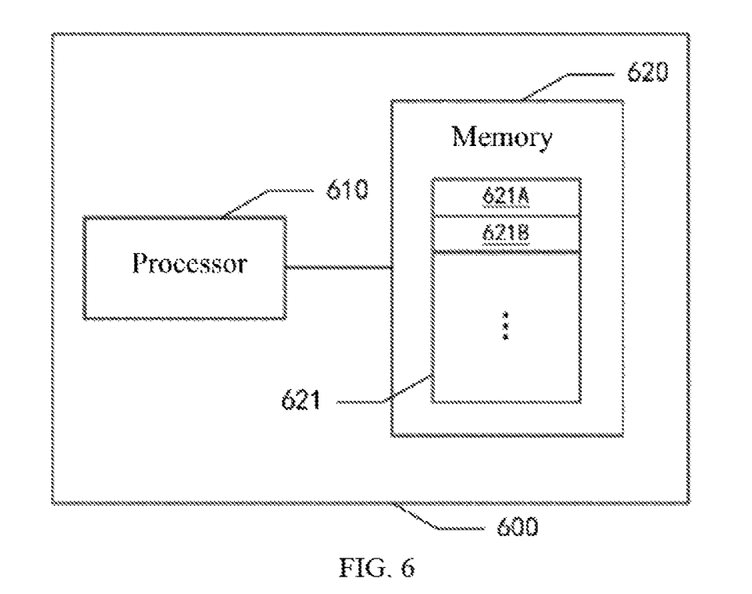
FIG. 6 illustrates an example of a block diagram of a computer system for implementing a method and a system for processing an image according to some embodiments of the present disclosure.

FIG. 6 illustrates an example of a block diagram of a computer system for implementing a method and a system for processing an image according to some embodiments of the present disclosure.

As shown in FIG. 6, a computer system 600 may include a processor 610 and a memory 620. The computer system 600 may execute the method described above with reference to FIGS. 2-3B.

Specifically, the processor 610 may include, for example, a general-purpose microprocessor, an instruction set processor, an associated chipset and/or a special-purpose microprocessor (e.g. an application-specific integrated circuit (ASIC)), and the like. The processor 610 may further include on-board memory configured for caching usage. The processor 610 may be a single processing unit or a plurality of processing units configured to execute different operations of the method flows according to the described embodiments of the present disclosure with reference to FIGS. 2-3B.

The memory 620 may be, for example, any medium capable of containing, storing, transmitting, propagating, or transmitting instructions. For example, a readable storage medium may include, but may not be limited to, an electronic, magnetic, optical, electromagnetic, infrared, or semiconductor system, apparatus, device, or propagation medium. Specific examples of readable storage media may include magnetic storage devices such as magnetic tapes or hard disk drives (HDD), optical storage devices such as optical disks (CD-ROM), memories such as random-access memories (RAM) or flash memories, and/or wired/wireless communication links.

The memory 620 may include computer programs 621. The computer programs 621 may include code/computer-executable instructions. When the computer programs are executed by the processor 610, the processor 610 may execute the method flows described above with reference to the FIGS. 2-3B and any variations thereof.

The computer programs 621 may be configured to have computer program code including, for example, computer program modules. For example, when implementing the embodiments, the code in the computer programs 621 may include one or more program modules, for example, including module 621A, modules 621B . . . . It should be noted that the division manner and the number of modules may not be fixed, and those skilled in the art may use appropriate program modules or program module combinations according to actual conditions. When the program module combinations are executed by the processor 610, the processor 610 may execute the method flows described above with reference to the FIGS. 2-3B and any variations thereof.

According to some embodiments of the present disclosure, at least one of the acquisition module 410, the first determination module 420, the processing module 430, the first output module 440, the second determination module 450, the third determination module 530, the first decision module 540, the computation module 550, the second decision module 560, the fourth determination module 570, and the second output module 580 may be implemented as described computer program modules with reference to FIG. 6, and may implement the corresponding operations described above when executed by the processor 610.

Those skilled in the art may understand that the features described in the various embodiments and/or claims of the present disclosure may be combined in various ways, even if such a combination is not explicitly described in the present disclosure. In particular, the features described in the various embodiments and/or claims of the present disclosure may be combined in various ways without departing from the spirit and teachings of the present disclosure. All of the combinations fall within the scope of the disclosure.

Although the present disclosure has been shown and described with reference to specific exemplary embodiments thereof, it should be understood by those skilled in the art that various changes in form and details may be made to the present disclosure without departing from the spirit and scope of the disclosure as defined by the appended claims and their equivalents. Therefore, the scope of the present disclosure may not be limited to the embodiments described above but may be determined not only by the appended claims, but also by the equivalents of the appended claims.

What is claimed is:

1. A method for processing an image, comprising: acquiring a first image including a foreground and a background; tracking a subject to be photographed in the foreground to determine a corresponding first foreground center offset and a corresponding first foreground pre-scaling ratio; in response to the first foreground pre-scaling ratio being within a preset numerical range, performing a smooth processing on the first foreground pre-scaling ratio to obtain a first foreground quasi-scaling ratio; in response to the first foreground pre-scaling ratio to be within a first sub-range of the preset numerical range, outputting a second image based on the first foreground center offset and the first foreground quasi-scaling ratio; tracking the subject according to the second image, to determine a corresponding second foreground center offset and a corresponding second foreground pre-scaling ratio; in response to the second foreground pre-scaling ratio being within a second sub-range, computing a product of the first foreground pre-scaling ratio and the second foreground pre-scaling ratio to be a second foreground quasi-scaling ratio; and outputting a third image according to the second foreground center offset and the second foreground quasi-scaling ratio.

2. A system for processing an image, comprising: a memory, storing program instructions; and one or more processors, coupled to the memory and, when the program instructions being executed, configured to: acquire a first image including a foreground and a background; track a subject to be photographed in the foreground to determine a corresponding first foreground center offset and a corresponding first foreground pre-scaling ratio; in response to the first foreground pre-scaling ratio being within a preset numerical range, perform a smooth processing on the first foreground pre-scaling ratio to obtain a first foreground quasi-scaling ratio; in response to the first foreground pre-scaling ratio to be within a first sub-range of the preset numerical range, output a second image based on the first foreground center offset and the first foreground quasi-scaling ratio; track the subject according to the second image, to determine a corresponding second foreground center offset and a corresponding second foreground pre-scaling ratio; in response to the second foreground pre-scaling ratio being within a second sub-range, compute a product of the first foreground pre-scaling ratio and the second foreground pre-scaling ratio to be a second foreground quasi-scaling ratio; and output a third image according to the second foreground center offset and the second foreground quasi-scaling ratio.

3. The method according to claim 1, wherein: the first image is a preview image or one of a plurality of photographed images.

4. The system according to claim 2, wherein the one or more processors are further configured to, before outputting the third image: determine whether the product is within the first sub-range; in response to the product being determined to be within the first sub-range, set the product as the ratio value of the second foreground quasi-scaling ratio.

5. A non-transitory computer-readable storage medium, containing program instructions for, when executed by a processor, performing a method for processing an image, the method comprising: acquiring a first image including a foreground and a background; tracking a subject to be photographed in the foreground to determine a corresponding first foreground center offset and a corresponding first foreground pre-scaling ratio; in response to the first foreground pre-scaling ratio being within a preset numerical range, performing a smooth processing on the first foreground pre-scaling ratio to obtain a first foreground quasi-scaling ratio; in response to the first foreground pre-scaling ratio to be within a first sub-range of the preset numerical range, outputting a second image based on the first foreground center offset and the first foreground quasi-scaling ratio; tracking the subject according to the second image, to determine a corresponding second foreground center offset and a corresponding second foreground pre-scaling ratio; in response to the second foreground pre-scaling ratio being within a second sub-range, calculating a product of the first foreground pre-scaling ratio and the second foreground pre-scaling ratio to be a second foreground quasi-scaling ratio; and outputting a third image according to the second foreground center offset and the second foreground quasi-scaling ratio.

6. The non-transitory computer-readable storage medium according to claim 5, wherein: the first image is a preview image or one of a plurality of photographed images.

\* \* \* \* \*